(12) United States Patent
Shiroshima et al.

(10) Patent No.: US 9,432,795 B2
(45) Date of Patent: Aug. 30, 2016

(54) COMMUNICATION SYSTEM, TERMINAL, COMMUNICATION METHOD AND COMMUNICATION PROGRAM FOR TERMINALS WHILE COMMUNICATING WITH EACH OTHER TO IDENTIFY THE OPPOSITE PARTY

(75) Inventors: Takahiro Shiroshima, Tokyo (JP); Masayuki Shimomura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/343,700

(22) PCT Filed: Aug. 8, 2012

(86) PCT No.: PCT/JP2012/005027
§ 371 (c)(1),
(2), (4) Date: Mar. 7, 2014

(87) PCT Pub. No.: WO2013/042301
PCT Pub. Date: Mar. 28, 2013

(65) Prior Publication Data
US 2014/0235227 A1   Aug. 21, 2014

(30) Foreign Application Priority Data
Sep. 21, 2011   (JP) ................................ 2011-206344

(51) Int. Cl.
*H04M 3/00* (2006.01)
*H04W 4/00* (2009.01)
(Continued)

(52) U.S. Cl.
CPC ......... *H04W 4/003* (2013.01); *H04M 3/42323* (2013.01); *H04W 68/00* (2013.01)

(58) Field of Classification Search
CPC H04W 4/003; H04W 3/42323; H04W 68/00
USPC .................. 455/418; 370/370, 338
See application file for complete search history.

(56) References Cited

U.S. PATENT DOCUMENTS 8,391,835 B1 * 3/2013 Lubart ............... G06Q 10/1091
455/405
2009/0240773 A1 * 9/2009 Kakie .......................... 709/205
(Continued)

FOREIGN PATENT DOCUMENTS

EP   2 214 389   8/2010
JP   2005-012380   1/2005
(Continued)

OTHER PUBLICATIONS

International Search Report corresponding to PCT/JP2012/005027 dated Sep. 25, 2012, 5 pages.
(Continued)

*Primary Examiner* — Marcos Batista
(74) *Attorney, Agent, or Firm* — Wilmer Cutler Pickering Hale and Dorr LLP (57) ABSTRACT

There is provided a relay server 20 relaying communications between terminals using an application. Each terminal 10 includes a voice call means 11 which performs a voice call process, and a voice call information transmission means 12 which, when the voice call process is performed by the voice call means 11, transmits to the relay server 20 a voice call status change notice inclusive of information for identifying the terminal 10 and indicative of voice call status having been changed, the transmission being performed by communication using the application. Upon receipt of communication data through communication using the application from a communication source terminal 10, the relay server 20 identifies a communication destination terminal based on the voice call status change notice and transmits the communication data to the identified communication destination terminal.

16 Claims, 7 Drawing Sheets (51) Int. Cl.
*H04M 3/42* (2006.01)
*H04W 68/00* (2009.01)

(56) References Cited

U.S. PATENT DOCUMENTS

2010/0054148 A1  3/2010  Murakami et al.
2010/0266108 A1* 10/2010 Shiroshima ................ 379/88.19
2012/0063577 A1*  3/2012  Foster ........................ 379/93.02

FOREIGN PATENT DOCUMENTS

| JP | 2007-166018 | 6/2007 |
| JP | 2009-182647 | 8/2009 |
| JP | 2009-187320 | 8/2009 |
| JP | 2009-187321 | 8/2009 |
| JP | 2010-225106 | 10/2010 |
| WO | WO-2008/146397 | 12/2008 |
| WO | WO-2009/066671 | 5/2009 |

OTHER PUBLICATIONS

Ableson, Frank et al., Unlocking Android: A Developer's Guide, "Code kara Wakaru Android Programing no Shikumi", Kaihatsu de Komatta Toki no Kaitetsu Approach, 1st edition, 2nd print, Nikkei Business Publications, In., Koji Segawa, May 12, 2010, pp. 239-246.

* cited by examiner

| VOICE CALL STATUS | IDENTIFIER 1 | IDENTIFIER 2 |
|---|---|---|
| VOICE CALL UNDERWAY | 1001 | 1002 |

COMMUNICATION SYSTEM, TERMINAL, COMMUNICATION METHOD AND COMMUNICATION PROGRAM FOR TERMINALS WHILE COMMUNICATING WITH EACH OTHER TO IDENTIFY THE OPPOSITE PARTY

CROSS-REFERENCE TO RELATED APPLICATIONS

This application is a national stage application of International Application No. PCT/JP2012/005027 entitled "COMMUNICATION SYSTEM, TERMINAL, COMMUNICATION METHOD AND COMMUNICATION PROGRAM," filed on Aug. 8, 2012, which claims the benefit of the priority of Japanese Patent Application No. 2011-206344, filed Sep. 21, 2011, the disclosures of each of which are hereby incorporated by reference in their entirety.

TECHNICAL FIELD

The present invention relates to a communication system, a terminal, a communication method and a communication program for terminals while communicating with each other to identify the opposite party.

BACKGROUND ART

With advances in cellular telephony, it has become possible for the users of mobile terminals such as smartphones to install desired applications in their devices for application usage. These mobile terminals are equipped with the function to acquire an application by recognizing a terminal status change such as the start or end of a communication as an event.

There have been proposed remote collaboration systems whereby remotely located users collaborate on a task via a network. Also, there have been proposed teleconferencing systems whereby such users refer to materials, draw diagrams, or exchange files at the same time.

With these teleconferencing systems, users form a group for a certain period of time in advance or for the moment. The users belonging to the group exchange messages between them, and the users' terminals carry out processes corresponding to the exchanged messages to implement a teleconference. The members participating in the group and the period of time in which the group is being formed are managed as a session. Control is performed so that as long as the session is continued, the members taking part in the session are allowed to exchange messages therebetween. A program running on the terminals operated by users of such a remote collaboration system has the function to transmit as data the operations carried out on each terminal to the other terminals so that the program having received the data executes what is described by the receive data on its own terminal.

In connection with these teleconferencing systems, there have been proposed methods for designating a collaborative partner in linkage with a telephone.

Patent Literature 1 cited below describes a system that permits messages to be exchanged between client terminals in linkage with voice call connection status of their telephones.

Patent Literature 2 cited below describes a system that allows a private branch exchange to manage personal computers (PCs) linked with telephone numbers. With the system disclosed by Patent Literature 2, telephones having specific telephone numbers may initiate a voice call with each other via the private branch exchange. In turn, the PCs corresponding to the telephones communicating with each other are notified of the start of an application by the private branch exchange. The notification causes the application to be started on the PCs corresponding to the telephones.

Patent Literature 3 cited below describes a system that offers a file-sharing space to the users engaged in a voice call with each other via an exchange. The PCs utilized by these users are then used to store and acquire files to and from the file-sharing space.

Patent Literature 4 cited below describes a system that generates a browser-to-browser session. With the system disclosed by Patent Literature 4, the home gateways (HGW) of the caller and receiver of each voice call send their own terminals' telephone numbers and their call session IDs to a service server as voice call session information. The system uses a correspondence server to associate browser accesses with the voice call session information to generate a browser-to-browser session.

Patent Literature 5 describes a system in which Web browsers installed in a plurality of terminals exchange messages via a message relay server incorporated in a Web server, whereby the individual Web browsers are synchronized.

CITATION LIST

Patent Literature

Patent Document 1 International Publication No. WO2009/066671
Patent Document 2 JP-A 2005-012380
Patent Document 3 JP-A 2007-166018
Patent Document 4 JP-A 2009-187320
Patent Document 5 JP-A 2010-225106

SUMMARY OF INVENTION

Technical Problem

The systems described in the above-cited Patent Literature 1, 2 and 3 require that, in order to acquire voice call status of voice call terminals such as telephones, an exchange controlling a voice call between these terminals transmit signals indicative of voice call status to another equipment. Generally, the exchange controlling voice call terminals such as telephones handles complicated processes and is not prone to being additionally furnished with the function to provide voice call status notification. Furthermore, there exist numerous exchanges that will incur high costs if they are to be furnished with such a function.

It is therefore an exemplary object of the present invention to provide a communication system, a terminal, a communication method and a communication program capable of implementing application-to-application communications in linkage with voice calls on terminals without the need for call status notification from circuit switching equipment.

Solution to Problem

According to the present invention, there is provided a communication system including a relay server relaying communications between terminals using applications. Each of the terminals includes: voice call means which performs a voice call process, and voice call information transmission means which, when the voice call process is performed by the voice call means, transmits to the relay server a voice call status change notice inclusive of information for identifying the terminal and indicative of voice call status having been changed, the transmission being performed by communication using the application. The relay server includes inter-application communication means which, upon receipt of communication data through communication using the application from a communication source terminal, identifies a communication destination terminal based on the voice call status change notice and transmits the communication data to the identified communication destination terminal.

According to the present invention, there is provided a communication system including: a terminal which has functionality to make a voice call through user operation and to execute an application; a terminal for use by a user as an opposite party; circuit switching equipment which performs voice call control for terminals to make a voice call therebetween; and a relay server which relays communications between applications on terminals. Each of the terminals includes: voice call means which controls a voice call between users; a voice call information linkage unit which acquires information indicative of voice call status from the voice call means and which transmits information indicative of the voice call status to the relay server; and own ID storage means which stores a terminal identifier for identifying the terminal on which a voice call linkage application runs, the voice call linkage application communicating with the application on the terminal of the opposite party via the relay server. The relay server includes: voice call status reception means which receives a voice call status change notice giving notification of a change in the voice call status of a terminal; voice call status storage means which stores information indicative of the voice call status of each of the terminals, and inter-application communication means which communicates with the voice call linkage application running on the terminals so as to relay communications between the applications.

According to the present invention, there is provided a terminal including: voice call means which controls a voice call between users; a voice call information linkage unit which acquires information indicative of voice call status from the voice call means and which transmits the information indicative of the voice call status to a relay server; and own ID storage means which stores a terminal identifier for identifying the terminal on which a voice call linkage application runs, the voice call linkage application communicating with the application on the terminal of an opposite party via the relay server.

According to the present invention, there is provided a communication method including: when a voice call process is performed, causing a terminal to transmit to a relay server a voice call status change notice inclusive of information for identifying the terminal and indicative of voice call status having been changed, through communication using an application, and upon receipt of communication data through communication using the application from a communication source terminal, causing the relay server to identify a communication destination terminal based on the voice call status change notice and to transmit the communication data to the identified communication destination terminal.

According to the present invention, there is provided a communication program causing a computer to execute: when a voice call process is performed, transmitting to a relay server a voice call status change notice inclusive of information for identifying terminals and indicative of voice call status having been changed, through communication using an application.

Advantageous Effects of Invention

According to the present invention, it is possible to implement inter-application communications in linkage with a voice call on terminals with no need for voice call status notification being sent from circuit switching equipment.

DESCRIPTION OF EMBODIMENTS

First Exemplary Embodiment

The first exemplary embodiment of the present invention is explained below with reference to the accompanying drawings.

Figure 1:
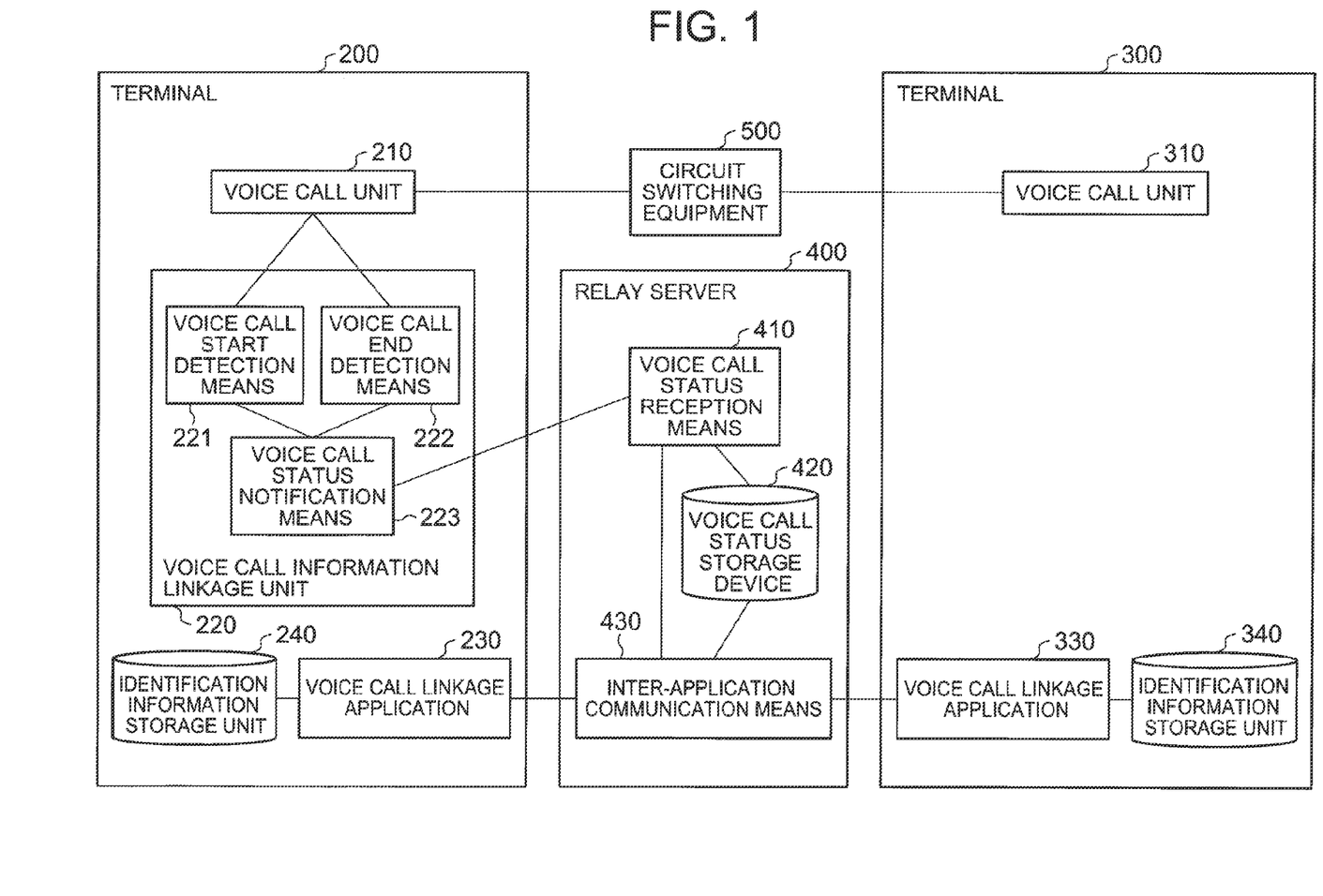
FIG. 1 It depicts a schematic diagram depicting a configuration of a communication system as a first exemplary embodiment of the present invention.

FIG. 1 is a schematic diagram depicting a configuration of a communication system as the first exemplary embodiment of the present invention.

As depicted in FIG. 1, the communication system according to the invention includes a terminal 200, another terminal 300, and a relay server 400. The terminals 200 and 300 are connected in a manner communicable with each other via the relay server 400.

The terminals 200 and 300 are connected to the relay server 400 via a network such as the Internet. Also, the terminals 200 and 300 are connected to circuit switching equipment 500 via a network such as a wired or wireless telephone network.

When a voice call is made between terminals, a communication is performed therebetween via the telephone network that includes circuit switching equipment. When an inter-application communication is performed between terminals, the communication is carried out therebetween over the network.

The circuit switching equipment 500 holds the ID or telephone number of each of the terminals. Upon receipt of a voice call start request or a voice call end request from one terminal to another, the circuit switching equipment 500 performs a process for establishing the voice call between the terminals. The circuit switching equipment 500 is implemented using existing methods that are common knowledge and thus will not be explained further. Alternatively, the circuit switching equipment 500 may be included in the communication system.

The terminals 200 and 300 may be mobile phones or the like and are each equipped with functions to make voice calls and perform applications.

The terminal 200 includes a voice call unit 210, a voice call information linkage unit 220, and an identification information storage unit 240. A voice call linkage application 230 is an application that can be run on the terminal 200. The voice call unit 210 and voice call information linkage unit 220 are implemented by a CPU provided in the terminal 200.

The voice call unit 210 performs a voice call process. The voice call unit 210 is a common voice call device (e.g., voice call circuit unit) furnished in mobile phones and like terminals.

The voice call unit 210 transmits a user's voice input through a microphone mounted on the terminal 200 to the terminal of the opposite party via a wireless network or the like. Also, the voice call unit 210 receives a voice signal received from another terminal via the wireless network or the like and outputs the received voice signal to a speaker mounted on the terminal 200. This allows the user of the terminal 200 to make a voce call with the user of another terminal. This voice call method is common knowledge and thus will not be explained in detail.

The voice call information linkage unit 220 transmits voice call status of the voice call unit 210. Specifically, the voice call information linkage unit 220 transmits to the relay server 400 a voice call status change notice indicative of a change that has occurred in the voice call status of the voice call unit 210.

The voice call information linkage unit 220 includes voice call start detection means 221, voice call end detection means 222, and voice call status notification means 223.

The voice call start detection means 221 detects the point in time at which a voice call is started by the voice call unit 210.

The voice call end detection means 222 detects the point in time at which the voice call is terminated by the voice call unit 210.

It is assumed that the voice call start detection means 221 and the voice call end detection means 222 may be implemented using, say, an event detection method provided by API (Application Programming Interface) provided in the terminal 200.

The voice call status notification means 223 transmits to the relay server 400 a voice call status change detected by the voice call start detection means 221 or by the voice call end detection means 222 as a voice call status change notice. With this embodiment, the voice call status notification means 223 detects two points in time, the start and the end of a voice call. However, if it is possible to acquire voice call status other than the start or end of a voice call, detection means for acquiring such voice call status may be added to the voice call status notification means 223 so that the voice call status notification means 223 may transmit that voice call status to the relay server 400.

The voice call linkage application 230 transmits and receives communication data through the relay server 400 to and from an application running on another terminal that is the opposite party. It should be noted that the wording "the voice call linkage application transmits and receives" actually means that the CPU performs the process in accordance with the application.

The identification information storage unit 240 stores an identifier (terminal identifier) for identifying the terminal on which the voice call linkage application 230 runs. Specifically, the identification information storage unit 240 is implemented by a memory or the like provided in the terminal 200.

The terminal 300 includes a voice call unit 310 and an identification information storage unit 340. A voice call linkage application 330 is an application that can be run on the terminal 300.

The voice call unit 310 and identification information storage unit 340 in the terminal 300 are structured the same as the communication unit 210 and identification information storage unit 240 in the terminal 200 and thus will not be explained further. Also, the voice call linkage application 330 includes the same functionality as the voice cal linkage application 230.

Incidentally, in FIG. 1, the terminal 300 may also include a voice call information linkage unit as with the terminal 200. Whereas FIG. 1 depicts only two terminals 200 and 300, three or more terminals may operate at the same time.

The relay server 400 mediates communications between applications running on terminals. The relay server 400 may be implemented specifically by an information processing apparatus such as a PC.

The relay server 400 includes voice call status reception means 410, a voice call status storage device 420, and inter-application communication means 430. The voice call status reception means 410 and the inter-application communication means 430 are implemented by the CPU furnished in the relay server 400.

The voice call status reception means 410 receives voice call status reception notices from terminals.

The voice call status storage device 420 holds the voice call status of each of the terminals. Specifically, the voice call status storage device 420 retains voice call status information indicative of voice call status of each terminal. The voice call status storage device 420 is implemented specifically by a database device such as a magnetic disk device provided in the relay server 400.

The inter-application communication means 430 communicates with the voice call linkage applications running on the terminals 200 and 300 and mediates communications between the applications.

The workings of this embodiment are explained below.

Figure 2:
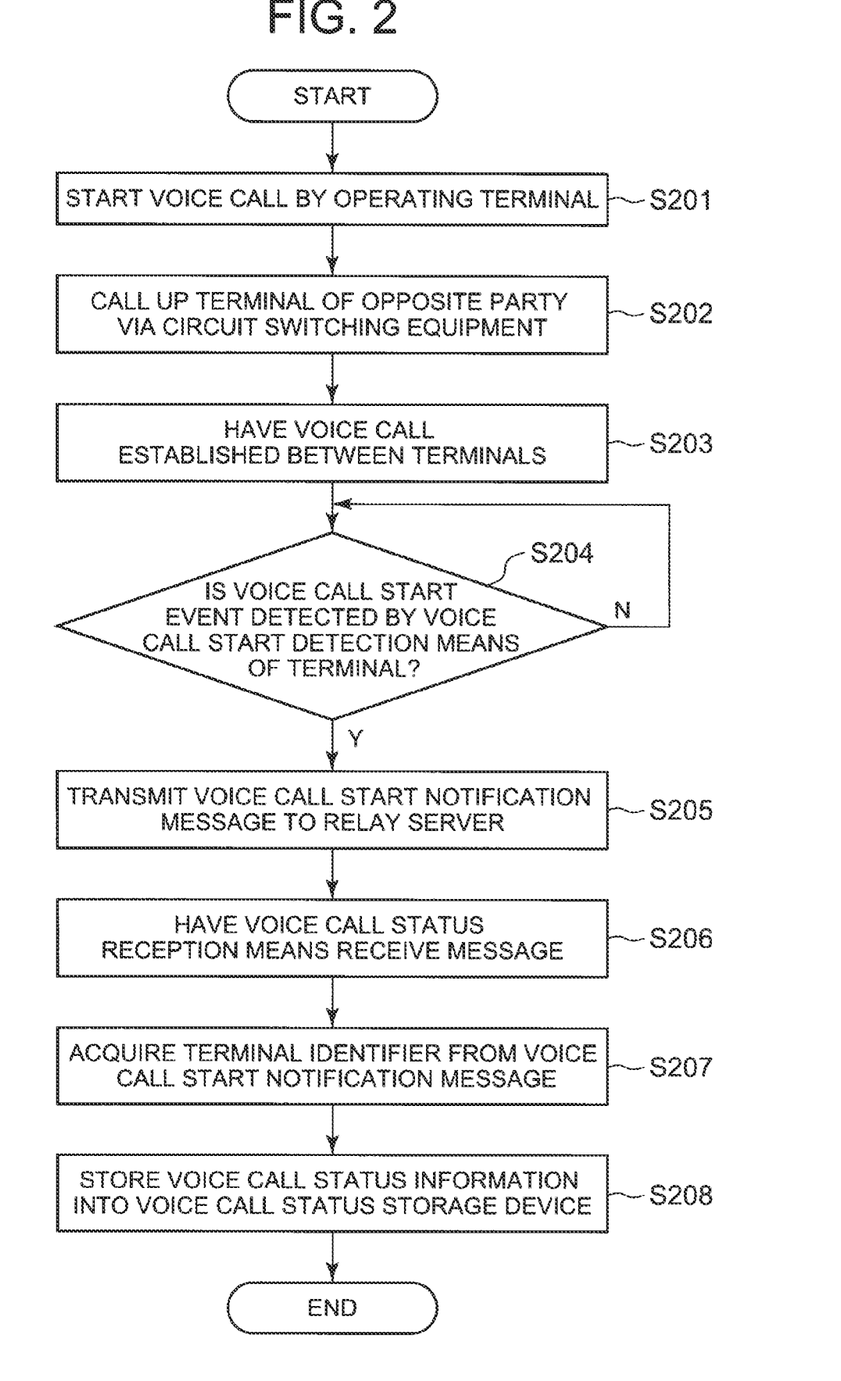
FIG. 2 It depicts a flowchart depicting a process performed by a terminal upon start of a voice call in the first exemplary embodiment.

FIG. 2 is a flowchart depicting a process performed by the terminal 200 upon start of a voice call in the first exemplary embodiment.

The user of the terminal 200 operates it to start a voice call with the user of another terminal (opposite party). In turn, the voice call unit 210 of the terminal 200 carries out a voice call starting process (step S201) in keeping with the user's operations. For example, the user of the terminal 200 operates a numeric keypad or other keys provided on the terminal 200 or a numeric keypad or an address book display on the touch panel of the terminal 200 to designate the telephone number of the opposite party's terminal, before starting a voice call. Alternatively, some other suitable method may be used to initiate a voice call. At this point, the voice call unit 210 transmits a voice call start request together with the telephone number to the circuit switching equipment 500. For this embodiment, an example is used in which the user of the terminal 200 makes a voice call with the user of the terminal 300.

Upon receipt of the voice call start request from the voice call unit 210 of the terminal 200, the circuit switching equipment 500 calls up the terminal corresponding to the telephone number (terminal 300) designated in the voice call start request (step S202).

Then a voice call is established between the terminal 200 and the terminal 300 (step S203).

Where terminal users utilize an IP telephone service, invoking and cutting off a voice call between terminals and responding to a voice call are performed using SIP (Session Initial Protocol) protocol, H.323 protocol or the like. The procedures for invoking, responding to, and cutting off the voice call between terminals are well known and thus will not be explained further.

After step S203, the voice call start detection means 221 in the voice call information linkage unit 220 detects starting of the voice call by the communication unit 210 as a voice call start event ("Yes" in step S204).

For example, if the identifier (telephone number) of the terminal 200 is "1001" and that of the terminal 300 is "1002." what is detected here is a voice call start event indicating that a voice call has been initiated from "1001" to "1002."

The voice call start detection means 221 hands the voice call start event over to the voice call status notification means 223. In turn, the voice call status notification means 223 transmits a voice call start notification message indicative of the start of a voice call to the voice call status reception means 410 in the relay server 400 (step S205).

For example, the voice call start notification message in step S205 may be the following data:
CALL FROM=1001 TO=1002

The data above indicates that a voice call has been initiated from the terminal having the identifier "1001" to the terminal with the identifier "1002." The identifier of the terminal having initiated the voice call is placed immediately after "FROM=" and the identifier of the terminal of the opposite party is set immediately after "TO=." Alternatively, the voice call start notification message may be in some other suitable format.

Upon receipt of the voice call start notification message (step S206), the voice call status reception means 410 in the relay server 400 acquires the identifiers "1001" and "1002" of the terminals currently in a voice call with each other (step S207). And the voice call status reception means 410 stores into the voice call status storage device 420 voice call status information indicating that the terminals having the identifiers "1001" and "1002" are currently in a voice call with each other (step S208).

If the terminal 300 is furnished with the voice call information linkage unit, then the process of steps S201 through S208 is performed at the start of a voice call as with the terminal 200, with preparations made for a communication between the voice call linkage applications. In this case, the voice call start notification message in step S205 will be made of the following data:
CALL FROM=1002 TO=1001

Figure 3:
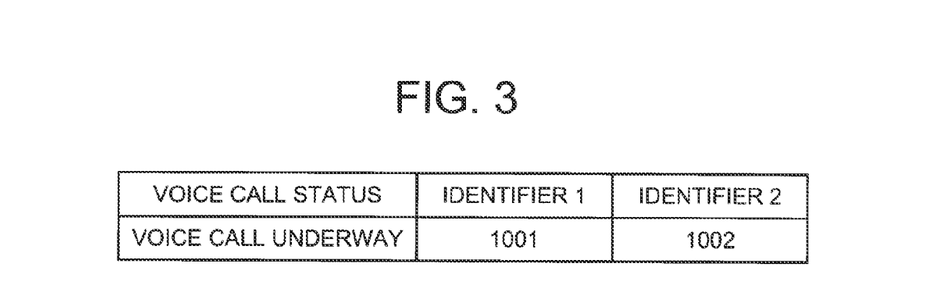
FIG. 3 It depicts a tabular view listing typical voice call status information.

FIG. 3 is a tabular view listing typical voice call status information. The voice call status information shown in FIG. 3 indicates that the terminals having the identifiers "1001" and "1002" are currently in a voice call with each other.

Although the voice call status information in FIG. 3 includes two identifiers (identifier 1 and identifier 2) corresponding to the voice call status in effect, there may be included three or more identifiers corresponding to the voice call status in the voice call status information. The voice call status information including three or more identifiers indicates voice call status in effect when three or more terminals are in a voice call with one another. Also, the voice call status storage device 420 may retain a plurality of sets of voice call status information.

Figure 4:
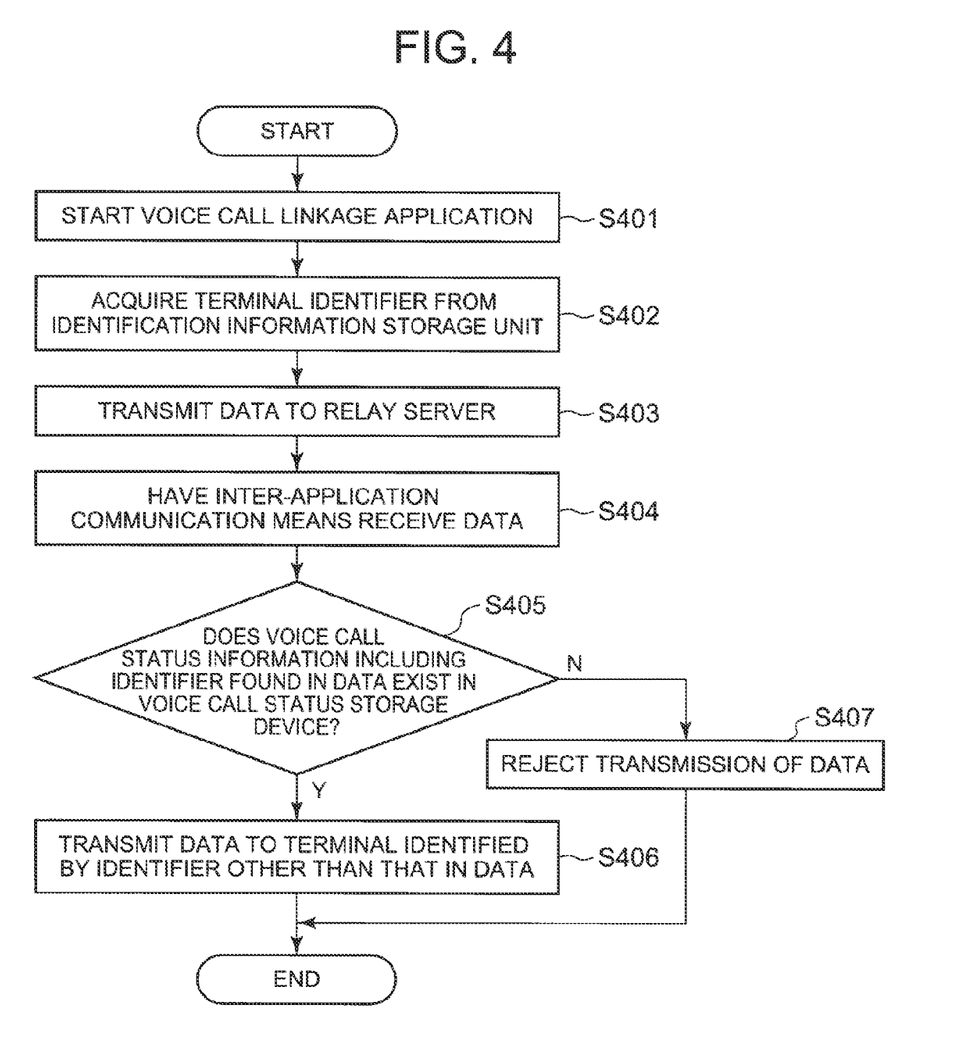
FIG. 4 It depicts a flowchart depicting a process performed by the communication system as the first exemplary embodiment after a voice call linkage application is started on a terminal.

FIG. 4 is a flowchart depicting a process performed by the communication system as the first exemplary embodiment after the voice call linkage application 230 is started on the terminal 200.

When the user of the terminal 200 operates it to start the voice call linkage application 230, the terminal 200 starts the voice call linkage application 230 (step S401). For example, the user of the terminal 200 may start the voice call linkage application 230 by clicking on an image indicative of the voice call linkage application 230 on a display device attached to the terminal 200 or by performing operations to select the item of the voice call linkage application 230 from a menu screen displayed on the display device.

After getting started, the voice call linkage application 230 acquires from the identification information storage unit 240 the identifier of the terminal (terminal 200) on which it runs (step S402). The voice call linkage application 230 then transmits data to the relay server 400 along with the acquired identifier (step S403). For example, the identifier may be one described in a file or the like or the telephone number held in the voice call unit 210.

For example, the data transmitted in step S403 by the voice call linkage application 230 may be as follows:
ID=1001&MESSAGE="Hello"

The data above indicates that a message "Hello" is transmitted from the terminal having the identifier "1001." The identifier of the transmission source terminal is set immediately after "ID=" and the message is placed immediately after "MESSAGE=." Alternatively, the data transmitted by the voice call linkage application 230 may be in some other suitable format.

Upon receipt of the data transmitted by the voice call linkage application 230 (step S404), the inter-application communication means 430 of the relay server 400 acquires the identifier "1001" included in the receive data.

The inter-application communication means 430 determines whether or not the voice call status information including the identifier acquired in step S404 exists in the voice call status storage device 420 (step S405).

If there exists the voice call status information including the identifier acquired in step S404 ("Yes" in step S405), the inter-application communication means 430 transmits the data received in step S404 to the terminal identified by another identifier included in that voice call status information (step S406). For example, in the case of what is shown in FIG. 3, the identifier "1001" is stored in the voice call status storage device 420 in relation to the identifier "1002," so that the data is transmitted to the terminal 300 identified by the identifier "1002."

Alternatively, the inter-application communication means 430 may at this point determine the address of the transmission destination terminal (terminal 300) based on correspondence information in which the identifiers of terminals are associated with their addresses. The correspondence information may be stored in advance in a storage unit (not shown) furnished in the relay server 400.

If there exists no voice call status information that includes the identifier acquired in step S404 ("No" in step S405), the inter-application communication means 430 rejects transmission of the data (step S407).

Every time data is received from the voice call linkage application, the inter-application communication means 430 repeats the process of steps S404 through S407.

The preceding paragraphs explained the case where the voice call linkage application 230 is started on the terminal 200. In like manner, if the voice call linkage application 330 is started on the terminal 300, the terminal 300 carries out the process of steps S401 through S403, and the relay server 400 performs the process of steps S404 through S407.

Figure 5:
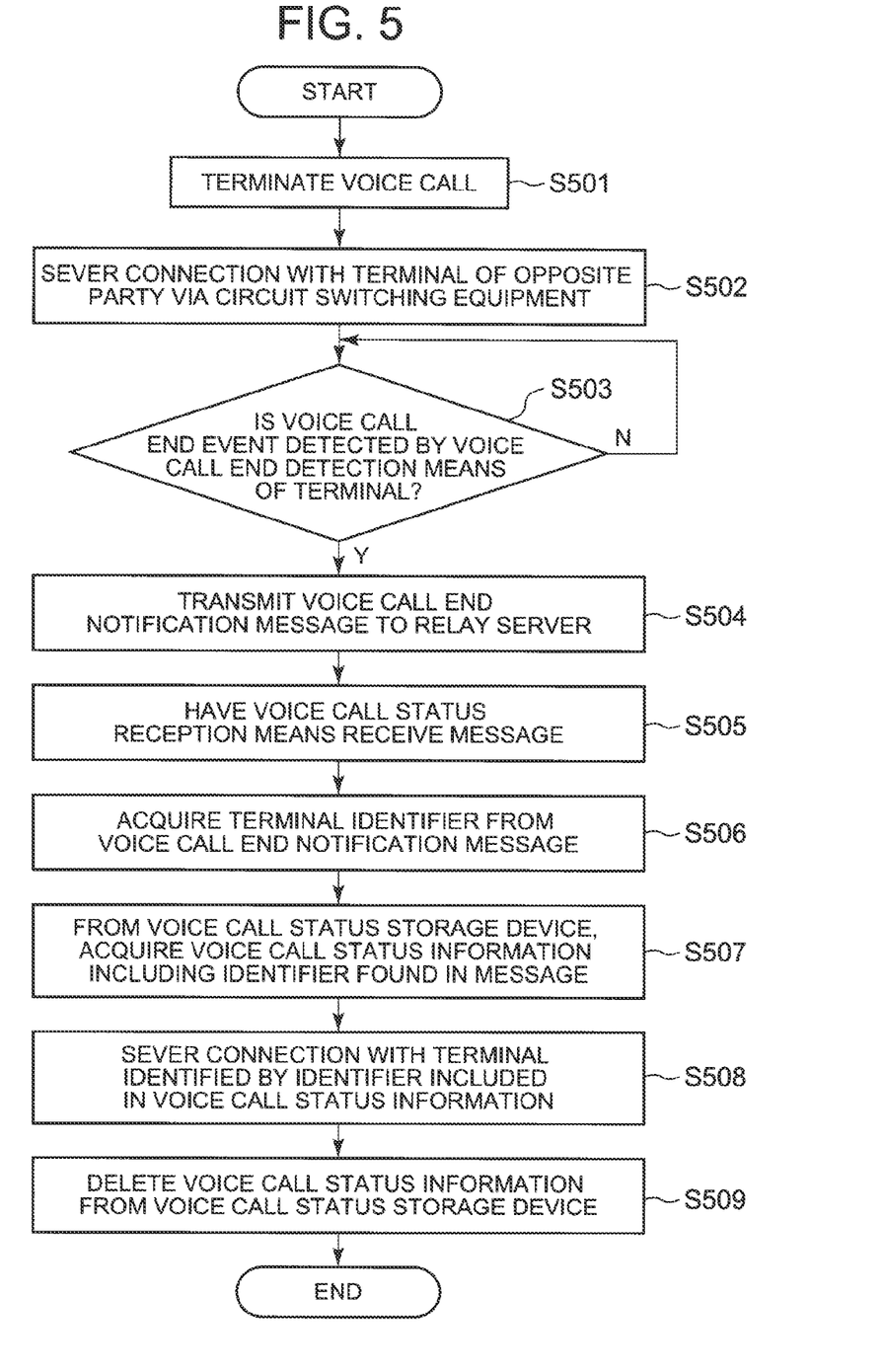
FIG. 5 It depicts a flowchart depicting a process performed by a terminal at the end of a voice call in the first exemplary embodiment.

FIG. 5 is a flowchart depicting a process performed by the terminal 200 at the end of a voice call in the first exemplary embodiment.

The user of the terminal 200 performs operations to end the voice call by pressing a voice call end button furnished on the terminal 200, for example. In response to the user's operations, the voice call unit 210 of the terminal 200 carries out the process of terminating the voice call (step S501). At this point, the voice call unit 210 transmits a voice call end request to the circuit switching equipment 500.

Upon receipt of the voice call end request from the terminal 200, the circuit switching equipment 500 terminates the voice call with the terminal (terminal 300) corresponding to the telephone number designated by the voice call end request (step S502).

If the termination of the voice call by the voice call unit 210 is detected as a voice call end event ("Yes" in step S503), the voice call end detection means 222 of the voice call information linkage unit 220 hands the voice call end event over to the voice call status notification means 223. In turn, the voice call status notification means 223 transmits a voice call end notification message indicative of the end of the voice call to the voice call information reception means 410 of the relay server 400 (step S504).

For example, the voice call end notification message in step S504 may be the following data:
BYE FROM=1001

The data above indicates that the voice call from the terminal having the identifier "1001" has ended. Alternatively, the voice call end notification message may be in some other suitable format.

Upon receipt of the voice call end notification message (step S505), the voice call information reception means 410 of the relay server 400 acquires the identifier "1001" of the terminal from the voice call end notification message (step S506). The voice call information reception means 410 notifies the inter-application communication means 430 that the terminal (terminal 200) having the identifier "1001" has terminated the voice call.

Based on the notification received in step S506, the inter-application communication means 430 acquires the voice call status information including the identifier "1001" from the voice call status storage device 420 (step S507). The inter-application communication means 430 then severs the connection between the terminals identified by the identifiers included in the acquired voice call status information, i.e., between the terminal having terminated the voice call (terminal 200) and the terminal of the opposite party (terminal 300) (step S508). At this point, the connection between the terminals may alternatively be cut off not immediately but after each of the terminals is notified of the end of the voice call.

After step S508, the inter-application communication means 430 deletes the voice call status information that includes the identifier "1001" from the voice call status storage device 420 (step S509).

With this embodiment, as explained above, the voice call information linkage unit 220 of the terminal 200 acquires the voice call status of the terminal 200 and transmits the acquired voice call status to the relay server 400, whereby the relay server 400 can acquire the voice call status of the terminals involved. This eliminates the need for getting the voice call status notification from the circuit switching equipment, and allows the terminals 200 and 300 to implement inter-application communication therebetween in linkage with the voice call. That is, because terminal voice call status can be acquired between the applications, there is no need to acquire voice call status by way of the circuit switching equipment 500.

Also with this embodiment, the voice call linkage application running on the terminal currently in a voice call with another terminal requests the relay server 400 to communicate with the opposite party, and the relay server 400 mediates communication with the application running on the terminal of the opposite party. As a result, the applications of the terminals in a voice call with each other can communicate with each other.

Since there is no need to set up equipment such as HGW for acquiring voice call status, the present invention can also be applied to the systems of users who have yet to install HGW or like equipment.

Furthermore, because terminal voice call status can be acquired between the applications, the costs required for modifying the circuit switching equipment 500 or installing HGW can be saved.

Although the inter-application communication means 430 of this embodiment transmits data to the address of the transmission destination terminal based on the correspondence information, the data may be transmitted alternatively using the connection established by the voice call linkage application for data reception. To implement such a configuration involves the voice call linkage application causing the inter-application communication means 430 to establish connection for data reception. Then the inter-application communication means 430 may transmit the data to the voice call linkage application through that connection. Where this configuration is in place, there is no need to store the correspondence information beforehand in the relay server 400.

Also, whereas this embodiment has been explained in connection with the case where the terminal 200 transmits the voice call status change notice, if the terminal 300 is equipped with the voice call information linkage unit, then the terminals 200 and 300 transmit a voice call status change notice each. In this case, the relay server 400 receives voice call status change notices from a plurality of terminals.

The relay sever 400 may store voice call status information into the voice call status storage device 420 only if the voice call start notification messages received from a plurality of terminals are the same in content. At this point, if the voice call start notification messages are different in content, then the relay server 400 may reject subsequently received voice call start notification messages and delete the voice call status information stored in the voice call status storage device 420.

Alternatively, regardless of the voice call start notification messages being the same or different in content, the voice call status corresponding to each of the voice call start notification messages may be stored into the voice call status storage device 420 as an independent item (voice call status information).

If voice call end notification messages are received from a plurality of terminals and if the voice call status storage device 420 does not store voice call status information corresponding to any of the voice call end notification messages (i.e., if the information is already deleted), the relay server 400 may terminate its processing without doing anything.

Second Exemplary Embodiment

The second exemplary embodiment of the present invention is explained below with reference to the accompanying drawings.

Figure 6:
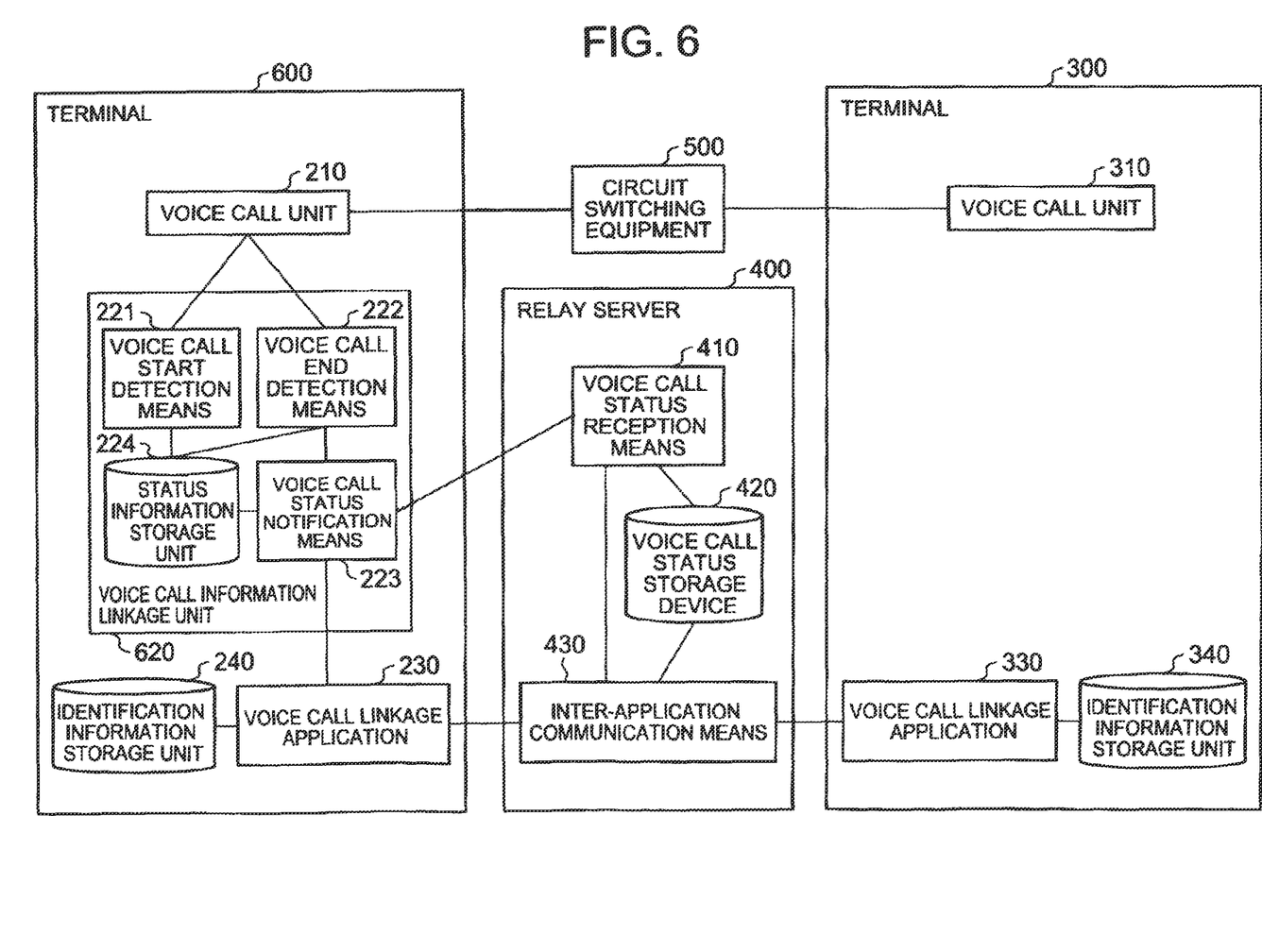
FIG. 6 It depicts a schematic diagram depicting a configuration of a communication system as a second exemplary embodiment of the present invention.

FIG. 6 is a schematic diagram depicting a configuration of a communication system as the second exemplary embodiment of the present invention.

As depicted in FIG. 6, the communication system includes a terminal 600, another terminal 300, and a relay server 400.

The terminal 600 includes a voice call information linkage unit 620.

The voice call information linkage unit 620 includes a status information storage unit 224 in addition to the voice call start detection means 221, voice call end detection means 222, and voice call status notification means 223.

The status information storage unit 224 retains information indicative of the voice call status of the voice call unit 210. Specifically, the status information storage unit 224 is implemented using a memory furnished in the terminal 200, for example.

The other structures of the terminal 600 in the second exemplary embodiment are the same as those of the terminal 200 in the first exemplary embodiment.

The workings of this embodiment are explained below.

Figure 7:
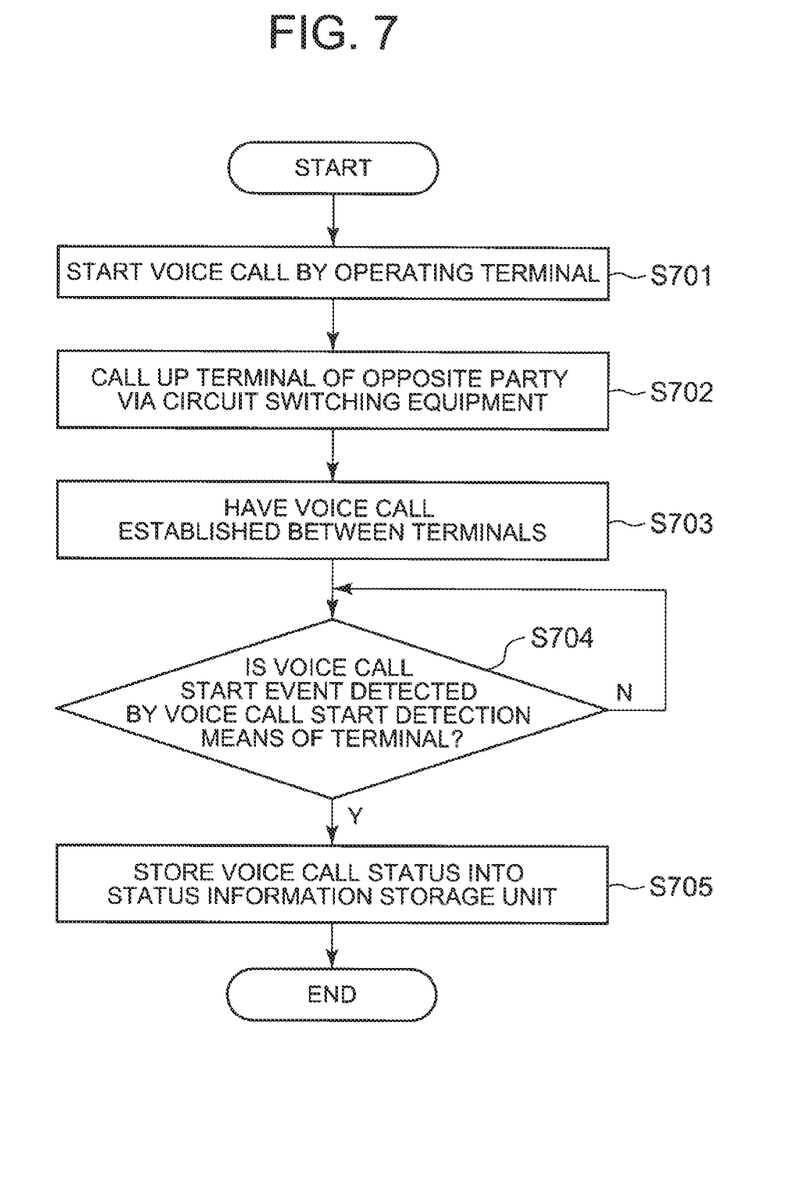
FIG. 7 It depicts a flowchart depicting a process performed by a terminal at the start of a voice call in the second exemplary embodiment.

FIG. 7 is a flowchart depicting a process performed by the terminal 600 at the start of a voice call in the second exemplary embodiment.

The process of steps S701 through S704 is the same as that of steps S201 through S204 with the first exemplary embodiment and thus will not be discussed further.

Upon detecting a voice call start event, the voice call start detection means 221 stores the event into the status information storage unit 224 as information indicative of the voice call status of the voice call unit 210 (step S705), and does not transmit a voice call start message for the moment.

Figure 8:
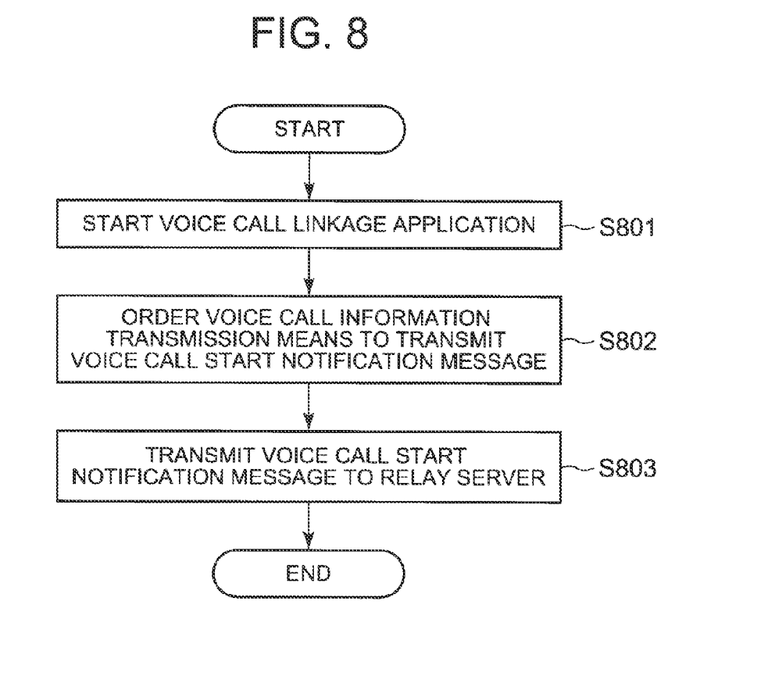
FIG. 8 It depicts a flowchart depicting a process performed by the communication system as the second exemplary embodiment after the voice call linkage application is started on a terminal.

FIG. 8 is a flowchart depicting a process performed by the communication system as the second exemplary embodiment after the voice call linkage application 230 is started on the terminal 600.

When the user of the terminal 600 operates it to start the voice call linkage application 230, the terminal 600 starts the voice call linkage application 230 (step S801).

The voice call linkage application 230 orders the voice call status notification means 223 to transmit a voice call start notification message (step S802).

After step S802, the voice call status notification means 223 transmits the information stored in the status information storage unit 224 in step S705 to the relay server 400 as the voice call start notification message (step S803).

After step S803, the mobile terminal 600 and the relay server 400 carry out the process of steps S402 through S407.

Also, upon receipt of the voice call start notification message after step S803, the voice call status reception means 410 of the relay server 400 carries out the process of steps S206 through S208.

The process performed by the terminal 600 at the end of a voice call is the same as the process of steps S501 through S509 in the first exemplary embodiment.

However, upon detecting a voice call end event during the process of step S503, the voice call end detection means 222 of the voice call information linkage unit 220 deletes the information stored in the status information storage unit 224 in step S705. Alternatively, step S504 and the subsequent steps may be arranged to be performed only while the voice call linkage application 230 is being started.

This embodiment, as explained above, offers the same effects as those of the first exemplary embodiment. Also, the embodiment allows the voice call start notification message to be transmitted to the relay server 400 only if the voice call linkage application 230 is started. This makes it possible to reduce the number of accesses during communication between the relay server 400 and the terminals, for example.

Figure 9:
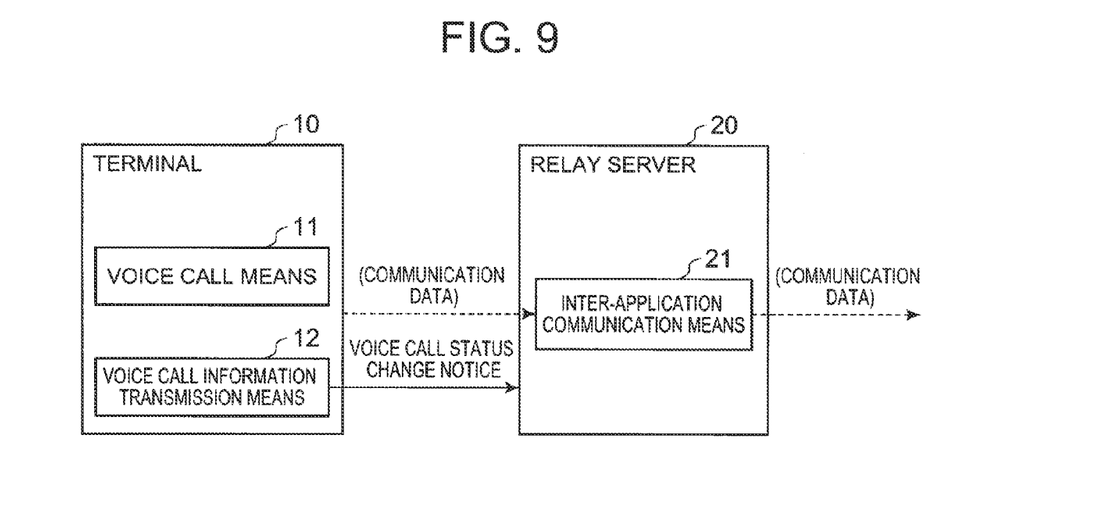
FIG. 9 It depicts a block diagram depicting the principal units of the communication system according to the present invention.

FIG. 9 is a block diagram depicting the principal units of the communication system according to the present invention. As depicted in FIG. 9, the communication system includes a relay server 20 (corresponding to the relay server 400 in FIG. 1) that relays communications between terminals using applications. A terminal 10 (corresponding to the terminal 200 in FIG. 1) includes voice call means 11 (corresponding to the voice call unit 210 of the terminal 200 in FIG. 1) which performs a voice call process, and voice call information transmission means 12 (corresponding to the voice call status notification means 223 of the terminal 200 in FIG. 1) which, when the voice call process is performed by the voice call means 11, transmits to the relay server 20 a voice call status change notice inclusive of information for identifying the terminal 10 and indicative of a change in voice call status, through communication using the application. The relay server 20 includes inter-application communication means 21 (corresponding to the inter-application communication means 430 of the relay server 400 in FIG. 1) which, upon receipt of communication data from a communication source terminal 10 through communication using the application, identifies a communication destination terminal (corresponding to the terminal 300 in FIG. 1) based on the voice call status change notice and transmits the communication data to the identified communication destination terminal.

The above-described exemplary embodiments also embrace the communication systems and terminals disclosed as follows:

(1) A communication system including a terminal 10 which has functionality to make a voice call through user operation and to execute an application; a terminal (corresponding to the terminal 300 in FIG. 1) for use by a user as an opposite party; circuit switching equipment (corresponding to the circuit switching equipment 500 in FIG. 1) which performs voice call control for terminals to make a voice call therebetween, and a relay server 20 which relays communications between applications on terminals. The terminal 10 includes voice call means 11 which controls a voice call between users; a voice call information linkage unit (corresponding to the voice call information linkage unit 220 of the terminal 200 in FIG. 1) which acquires information indicative of voice call status from the voice call means 11 and which transmits the information indicative of voice call status to the relay server 20, and own ID storage means (corresponding to the identification information storage unit 240 of the terminal 200 in FIG. 1) which stores a terminal identifier for identifying the terminal on which a voice call linkage application (corresponding to the voice call linkage application 230 in FIG. 1) runs, the voice call linkage application communicating with the application on the terminal of the opposite party via the relay server 20. The relay server 20 includes voice call status reception means (corresponding to the voice call status reception means 410 of the relay server 400 in FIG. 1) which receives a voice call status change notice giving notification of a change in the voice call status of a terminal; voice call status storage means (corresponding to the voice call status storage device 420 of the relay server 400 in FIG. 1) which stores the information indicative of the voice call status of each of the terminals, and inter-application communication means 21 which communicates with the voice call linkage application running on the terminals so as to relay communications between the applications.

(2) A communication system in which the voice call information linkage unit includes voice call start detection means (corresponding to the voice call start detection means 222 of the voice call information linkage unit 220 in FIG. 1) which detects a point in time at which a voice call is started by the voice call means 11; voice call end detection means (corresponding to the voice call end detection means 222 of the voice call information linkage unit 220 in FIG. 1) which detects a point in time at which the voice call is terminated by the voice call means 11; and voice call information transmission means 12 which transmits to the relay server 20 a detected change in voice call status as the voice call status change notice.

(3) A communication system in which, when a voice call is established by the voice call means 11 with the terminal of the opposite party, the voice call information linkage unit allows the voice call start detection means to detect the start of the voice call as a voice call start event using an application interface furnished in the terminal 10 and output the voice call start event to the voice call information transmission means 12; in which the voice call information transmission means 12 transmits the as a voice call start notification message to the voice call information reception means of the relay server 20; and in which the voice call status storage means of the relay server 20 stores information indicative of voice call status.

(4) A communication system in which, when a voice call is terminated by the voice call means 11, the voice call information linkage unit allows the voice call end detection means to detect the end of the voice call as a voice call end event using an application interface furnished in the terminal; in which the communication end detection means outputs the voice call end event to the voice call information transmission means 12; in which the voice call information transmission means 12 transmits the event as a voice call end notification message indicative of the end of the voice call to the voice call status reception means of the relay server 20; and in which the voice call status storage means of the relay server 20 deletes the information indicative of the voice call status.

(5) A communication system in which the voice call information linkage unit includes voice call information storage means (corresponding to the status information storage unit 224 of the terminal 600 in FIG. 4) which stores information indicative of voice call status of the terminal 10.

(6) A communication system in which, when a voice call is established by the voice call means 11 with the terminal of the opposite party, the voice call information linkage unit allows the voice call start detection means to detect the start of the voice call as a voice call start event using an application interface furnished in the terminal 10; in which the communication start detection means outputs the voice call start event to the voice call information storage means as information indicative of voice call status; and in which the voice call information storage means stores information indicative of voice call status.

(7) A terminal including voice call means 11 which controls a voice call between users; a voice call information linkage unit which acquires information indicative of voice call status from the voice call means 11 and which transmits the information indicative of the voice call status to a relay server 20; and own ID storage means which stores a terminal identifier for identifying the terminal on which a voice call linkage application runs, the voice call linkage application communicating with the application on the terminal of an opposite party via the relay server 20.

The above-described exemplary embodiments further embrace the communication systems and terminals disclosed as follows:

(Supplementary Note 1)

A communication system in which, when the voice call linkage application is started on the terminal 10, the voice call information linkage unit allows the voice call information transmission means 12 to transmit the information indicative of voice call status stored in the voice call information storage means to the voice call information reception means of the relay server 20 as a voice call start notification message; and in which the voice call status storage means of the relay server 20 stores the information indicative of voice call status.

(Supplementary Note 2)

A communication system in which, when a voice call is terminated by the voice call means 11, the voice call information linkage unit allows the voice call end detection means to detect the termination of the voice call as a voice call end event using an application interface furnished in the terminal 10, delete the information indicative of the voice call status stored in the voice call information storage means, and output the voice call end event to the voice call information transmission means 12; in which the voice call information transmission means 12 transmits a voice call end notification message indicative of the end of the voice call to the voice call status reception means of the relay server 20; and in which the voice call status storage means of the relay server 20 deletes the information indicative of the voice call status.

(Supplementary Note 3)

A terminal in which the voice call information linkage unit includes voice call start detection means which detects a point in time at which a voice call is started by the voice call means 11; voice call end detection means which detects a point in time at which the voice call is terminated by the voice call means 11; and voice call information transmission means 12 which transmits to the relay server 20 a detected change in voice call status as a voice call status change notice.

(Supplementary Note 4)

A terminal in which, when a voice call is established by the voice call means 11 of the terminal 10 with the terminal of the opposite party, the voice call information linkage unit allows the voice call start detection means to detect the start of the voice call as a voice call start event using an application interface furnished in the terminal 10 and transmit the voice call start event to the voice call information transmission means 12; in which the voice call information transmission means 12 transmits the event as a voice call start notification message to the voice call information reception means of the relay server 20; and in which the voice call status storage means of the relay server 20 stores information indicative of voice call status.

(Supplementary Note 5)

A terminal in which, when a voice call is terminated by the voice call means 11, the voice call information linkage unit allows the voice call end detection means to detect the end of the voice call as a voice call end event using an application interface furnished in the terminal; in which the communication end detection means outputs the voice call end event to the voice call information transmission means 12; in which the voice call information transmission means 12 transmits the event as a voice call end notification message indicative of the end of the voice call to the voice call status reception means of the relay server 20; and in which the voice call status storage means of the relay server 20 deletes the information indicative of voice call status.

(Supplementary Note 6)

A terminal in which the voice call information linkage unit includes voice call information storage means which stores information indicative of the voice call status of the terminal 10.

(Supplementary Note 7)

A terminal in which, when a voice call is established by the voice call means 11 of the terminal 10 with the terminal of the opposite party, the voice call information linkage unit allows the voice call start detection means to detect the start of the voice call as a voice call start event using an application interface furnished in the terminal 10; in which the communication start detection means outputs the voice call start event to the voice call information storage means as information indicative of voice call status; and in which the voice call information storage means stores the information indicative of voice call status.

(Supplementary Note 8)

A terminal in which, when the voice call linkage application is started on the terminal 10, the voice call information linkage unit allows the voice call information transmission means 12 to transmit the information indicative of voice call status stored in the voice call information storage means to the voice call information reception means of the relay server 20 as a voice call start notification message; and in which the voice call status storage means of the relay server 20 stores the information indicative of voice call status.

(Supplementary Note 9)

A terminal in which, when a voice call is terminated by the voice call means 11, the voice call information linkage unit allows the voice call end detection means to detect the termination of the voice call as a voice call end event using an application interface furnished in the terminal 10, delete the information indicative of voice call status stored in the voice call information storage means, and output the voice call end event to the voice call information transmission means 12; in which the voice call information transmission means 12 transmits a voice call end notification message indicative of the end of the voice call to the voice call status reception means of the relay server 20; and in which the voice call status storage means of the relay server 20 deletes the information indicative of voice call status.

Whereas the present invention has been explained above in reference to some exemplary embodiments and execution examples, these are not limitative of this invention. Various changes that can be understood by those skilled in the art may be made to the structures and details of the invention within the scope thereof.

This patent application claims priority to Japanese Patent Application No. 2011-206344 filed on Sep. 21, 2011, the entire content of which is hereby incorporated by reference.

REFERENCE SIGNS LIST 10, 200, 300 Terminal
11 Voice call means
12 Voice call information transmission means
20, 400 Relay server
21, 430 Inter-application communication means
210, 310 Voice call unit
220 Voice call information linkage unit
221 Voice call start detection means
222 Voice call end detection means
223 Voice call status notification means
224 Status information storage unit
230, 330 Voice call linkage application
240, 340 Identification information storage unit
410 Voice call status reception means
420 Voice call status storage device
500 Circuit switching equipment

The invention claimed is:

1. A communication system comprising a relay server relaying communications between terminals using applications;
   wherein each of the terminals includes:
      a hardware processor,
      a voice call unit, implemented by the hardware processor, which performs a voice call process, and
      a voice call information transmission unit, implemented by the hardware processor, which, when the voice call process is performed by the voice call unit, transmits to the relay server a voice call status change notice inclusive of information for identifying the terminal and indicative of voice call status having been changed, the transmission being performed by communication using the application, and
   wherein the relay server includes an inter-application communication unit which, upon receipt of communication data through communication using the application from a communication source terminal, identifies a communication destination terminal based on the voice call status change notice and transmits the communication data to the identified communication destination terminal,
   the voice call status having been changed is stored in a voice call information storage unit,
   the voice call information transmission unit stores the voice call status change notice upon detecting a voice call start event in the voice call information storage unit, and transmits the voice call status change notice to the relay server when ordered by, a voice call linkage application on the terminal, and
   upon detecting a voice call end event, the voice call information transmission unit transmits the voice call status change notice including a call end notification to the relay server and deletes the voice call status change notice in the voice call information storage unit.

2. A communication system comprising:
   a terminal which has functionality to make a voice call through user operation and to execute an application;
   a terminal for use by a user as an opposite party;
   circuit switching equipment which performs voice call control for terminals to make a voice call therebetween; and
   a relay server which relays communications between applications on terminals,
   wherein each of the terminals includes:
   a hardware processor;
   a voice call unit, implemented by the hardware processor, which controls a voice call between users;
   a voice call information linkage unit, implemented by the hardware processor, which acquires information indicative of voice call status from the voice call unit and stores the voice call status in a voice call information storage unit, and which includes a voice call information transmission unit which stores a voice call status change notice upon detecting a voice call start event, which transmits the voice call status change notice to the relay server when ordered by a voice call linkage application, and which transmits information indicative of the voice call status to the relay server; and an own ID storage unit which stores a terminal identifier for identifying the terminal on which the voice call linkage application runs, the voice call linkage application communicating with the application on the terminal of the opposite party via the relay server, wherein the relay server includes:

a voice call status reception unit which receives the voice call status change notice giving notification of a change in the voice call status of a terminal;

a voice call status storage unit which stores information indicative of the voice call status of each of the terminals; and an inter-application communication unit which communicates with the voice call linkage application running on the terminals so as to relay communications between the applications, wherein, upon detecting a voice call end event, the voice call status change notice including a call end notification is transmitted to the relay server and the voice call status change notice in the voice call information storage unit is deleted.

3. The communication system according to claim 2, wherein the voice call information linkage unit includes:

a voice call start detection unit which detects a point in time at which a voice call is started by the voice call unit; and a voice call end detection unit which detects a point in time at which the voice call is terminated by the voice call unit.

4. The communication system according to claim 3, wherein:

when a voice call is established by the voice call unit with the terminal of the opposite party, the voice call start detection unit in the voice call information linkage unit detects the start of the voice call as a voice call start event using an application interface furnished in the terminal;

a communication start detection unit outputs the voice call start event to the voice call information transmission unit;

the voice call information transmission unit transmits what is received as a voice call start notification message to a voice call information reception unit of the relay server; and the voice call status storage unit of the relay server stores information indicative of voice call status.

5. The communication system according to claim 3, wherein:

when a voice call is terminated by the voice call unit, the voice call end detection unit in the voice call information linkage unit detects the end of the voice call as a voice call end event using an application interface furnished in the terminal;

a communication end detection unit outputs the voice call end event to the voice call information transmission unit;

the voice call information transmission unit transmits what is received as a voice call end notification message indicative of the end of the voice call to the voice call status reception unit of the relay server; and the voice call status storage unit of the relay server deletes information indicative of voice call status.

6. The communication system according to claim 3, wherein the voice call information linkage unit includes a voice call information storage unit which stores information indicative of voice call status of terminals.

7. The communication system according to claim 3, wherein:

when a voice call is established by the voice call unit with the terminal of the opposite party, the voice call start detection unit in the voice call information linkage unit detects the start of the voice call as the voice call start event using an application interface furnished in the terminal;

a communication start detection unit outputs the voice call start event to the voice call information transmission unit;

the voice call information transmission unit transmits what is received as a voice call start notification message to a voice call information reception unit of the relay server; and the voice call status storage unit of the relay server stores information indicative of voice call status.

8. The communication system according to claim 7, wherein:

when a voice call is terminated by the voice call unit, the voice call end detection unit in the voice call information linkage unit detects the end of the voice call as a voice call end event using an application interface furnished in the terminal;

a communication end detection unit outputs the voice call end event to the voice call information transmission unit;

the voice call information transmission unit transmits what is received as a voice call end notification message indicative of the end of the voice call to the voice call status reception unit of the relay server; and the voice call status storage unit of the relay server deletes information indicative of voice call status.

9. The communication system according to claim 7, wherein the voice call information linkage unit includes a voice call information storage unit which stores information indicative of voice call status of terminals.

10. The communication system according to claim 3, wherein:

when a voice call is terminated by the voice call unit, the voice call end detection unit in the voice call information linkage unit detects the end of the voice call as a voice call end event using an application interface furnished in the terminal;

a communication end detection unit outputs the voice call end event to the voice call information transmission unit;

the voice call information transmission unit transmits what is received as a voice call end notification message indicative of the end of the voice call to the voice call status reception unit of the relay server; and the voice call status storage unit of the relay server deletes information indicative of voice call status.

11. The communication system according to claim 10, wherein the voice call information linkage unit includes a voice call information storage unit which stores information indicative of voice call status of terminals.

12. The communication system according to claim 2,
wherein the voice call information storage unit stores information indicative of voice call status of terminals.

13. The communication system according to claim 12, wherein:
when a voice call is established by the voice call unit with the terminal of the opposite party, a voice call start detection unit in the voice call information linkage unit detects the start of the voice call as the voice call start event using an application interface furnished in the terminal;
a communication start detection unit outputs the voice call start event to the voice call information storage unit as information indicative of voice call status; and
the voice call information storage unit stores the information indicative of voice call status.

14. A terminal comprising:
a hardware processor;
a voice call unit, implemented by the hardware processor, which controls a voice call between users;
a voice call information linkage unit, implemented by the hardware processor, which acquires information indicative of voice call status from the voice call unit and stores the voice call status in a voice call information storage unit, and includes a voice call information transmission unit which stores a voice call status change notice upon detecting a voice call start event, which transmits the voice call status change notice to a relay server when ordered by a voice call linkage application, and which transmits the information indicative of the voice call status to the relay server; and
an own ID storage unit which stores a terminal identifier for identifying the terminal on which the voice call linkage application runs, the voice call linkage application communicating with an application on the terminal of an opposite party via the relay server,
wherein, upon detecting a voice call end event, the voice call status change notice including a call end notification is transmitted to the relay server and the voice call status change notice in the voice call information storage unit is deleted.

15. A communication method comprising:
when a voice call process is performed, causing a terminal to transmit to a relay server a voice call status change notice inclusive of information for identifying the terminal and indicative of voice call status having been changed, through communication using an application,
upon receipt of communication data through communication using the application from a communication source terminal, causing the relay server to identify a communication destination terminal based on the voice call status change notice and to transmit the communication data to the identified communication destination terminal,
the voice call status having been changed is stored in a voice call information storage unit,
the voice call status change notice is stored in a voice call information transmission unit upon detecting a voice call start event in the voice call information storage unit, and the voice call status change notice is transmitted to the relay server when ordered by a voice call linkage application, and
upon detecting a voice call end event, the voice call information transmission unit transmits the voice call status change notice including a call end notification to the relay server and deletes the voice call status change notice in the voice call information storage unit.

16. A non-transitory computer readable information recording medium storing a communication program that, when executed by a processor, performs a method for:
when a voice call process is performed, transmitting to a relay server a voice call status change notice inclusive of information for identifying terminals and indicative of voice call status having been changed, through communication using an application,
the voice call status having been changed is stored in a voice call information storage unit,
the voice call status change notice is stored in a voice call information transmission unit upon detecting a voice call start event in the voice call information storage unit, and the voice call status change notice is transmitted to the relay server when ordered by a voice call linkage application, and
upon detecting a voice call end event, the voice call information transmission unit transmits the voice call status change notice including a call end notification to the relay server and deletes the voice call status change notice in the voice call information storage unit.

* * * * *